(12) United States Patent
Schulz et al.

(10) Patent No.: US 6,980,536 B1
(45) Date of Patent: Dec. 27, 2005

(54) ROAMING OF MOBILE PARTS IN AT LEAST PARTIALLY ASYNCHRONOUS WIRELESS TELECOMMUNICATIONS NETWORKS, ESPECIALLY DECT NETWORKS

(75) Inventors: Egon Schulz, München (DE); Rolf Biedermann, Ahaus (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,866

(22) PCT Filed: Aug. 24, 1998

(86) PCT No.: PCT/DE98/02474

§ 371 (c)(1),
(2), (4) Date: Mar. 2, 2000

(87) PCT Pub. No.: WO99/12372

PCT Pub. Date: Mar. 11, 1999

(30) Foreign Application Priority Data

Sep. 2, 1997 (DE) .................... 197 38 340

(51) Int. Cl.[7] .................. H04J 3/00; H04Q 7/00; H04Q 7/20
(52) U.S. Cl. ............... 370/337; 370/350; 370/331; 455/436
(58) Field of Search ................. 370/335, 342, 370/337, 320–324, 329–333, 350, 503, 507–510, 370/512–514; 455/426, 432, 434, 436, 437–439, 455/440–444

(56) References Cited

U.S. PATENT DOCUMENTS

| 5,448,569 | A | | 9/1995 | Huang et al. |
| 5,659,598 | A | * | 8/1997 | Byrne et al. ............... 455/426 |
| 5,754,956 | A | * | 5/1998 | Abreu et al. ............... 455/434 |
| 5,873,033 | A | * | 2/1999 | Hjern et al. ............... 455/437 |
| 5,878,343 | A | * | 3/1999 | Robert et al. ............... 455/426 |
| 5,930,712 | A | * | 7/1999 | Byrne et al. ............... 455/437 |
| 5,974,320 | A | * | 10/1999 | Ward et al. ............... 455/432 |
| 6,014,376 | A | * | 1/2000 | Abreu et al. ............... 370/350 |

FOREIGN PATENT DOCUMENTS

| WO | WO 94/21057 | 9/1994 |
| WO | WO 96/38990 | 12/1996 |
| WO | WO 96/38991 | 12/1996 |
| WO | WO 97/15160 | 4/1997 |

* cited by examiner

Primary Examiner—Steven Nguyen
(74) Attorney, Agent, or Firm—Bell Boyd & Lloyd LLC

(57) ABSTRACT

In order to qualitatively improve roaming of mobile parts (MT, RPP, DIPS) in at least partially asynchronous, wireless telecommunication networks (TKN) with telecommunication systems (TKS1 . . . TKSn) having a plurality of base stations (BS, RFP, DIFS) arranged in radio cells (FZ), first base stations (BS1, RFP1, DIFS1) which are respectively neighbored by at least one asynchronous second base station (BS2, RFP2, DIFS2) send information to first mobile parts (MT1, RPP1, DIPSI1) connectible by telecommunication to the first base stations (BS1, RFP1, DIFS1), said information indicating that the respective, first base station (BS1, RFP1, DIFS1) sending the information is surrounded by at least one second base station (BS2, RFP2, DIFS2).

20 Claims, 8 Drawing Sheets

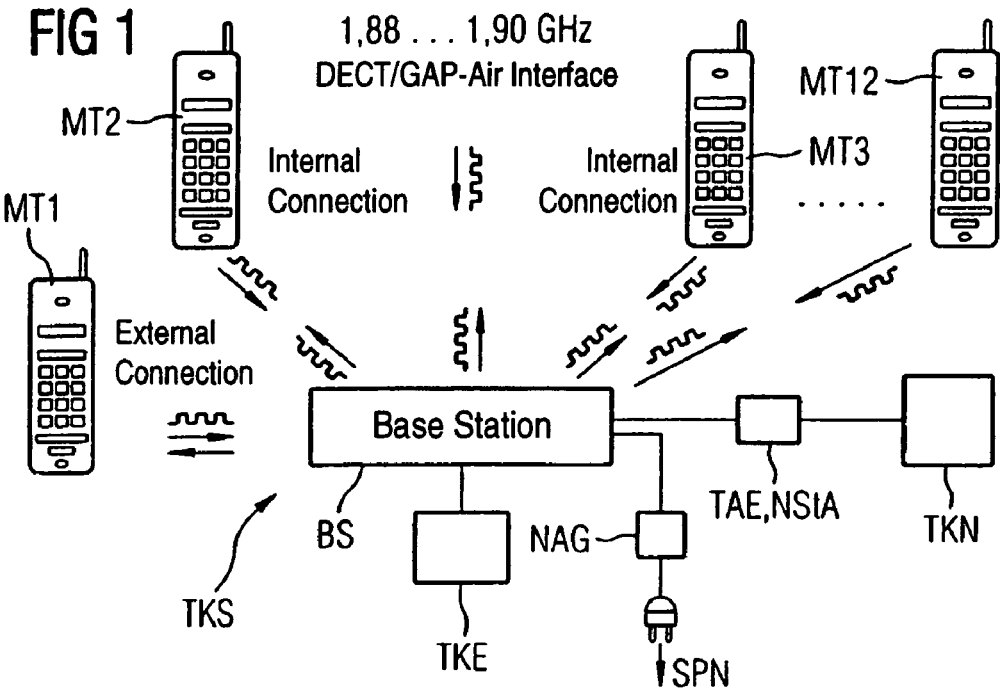
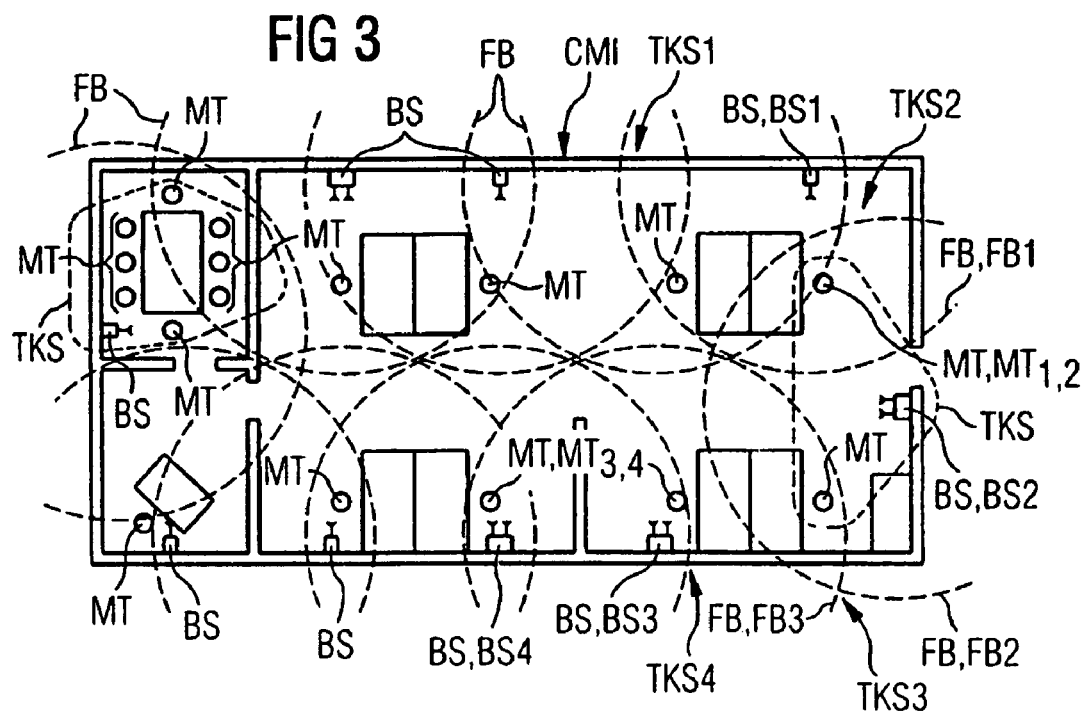

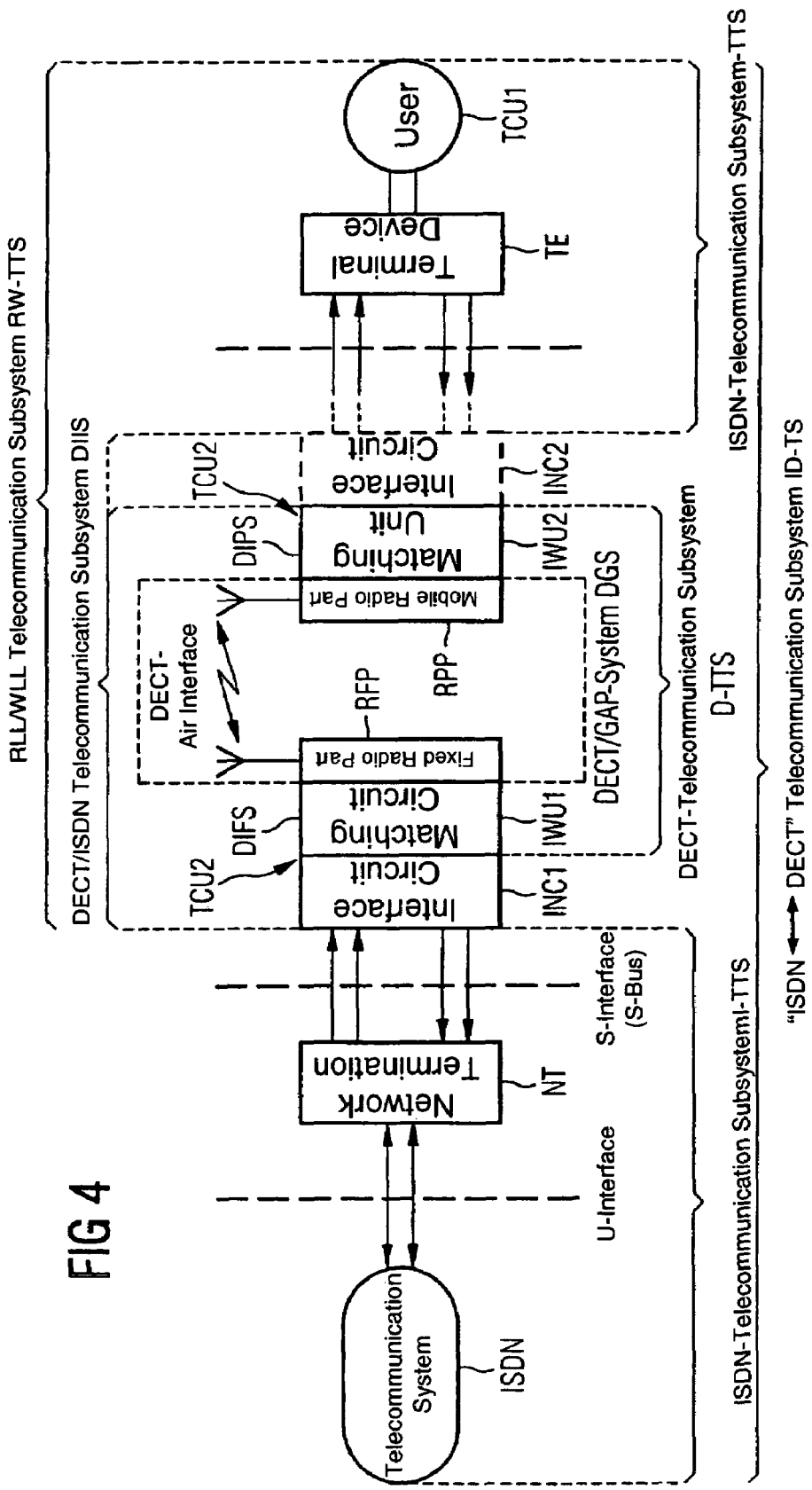

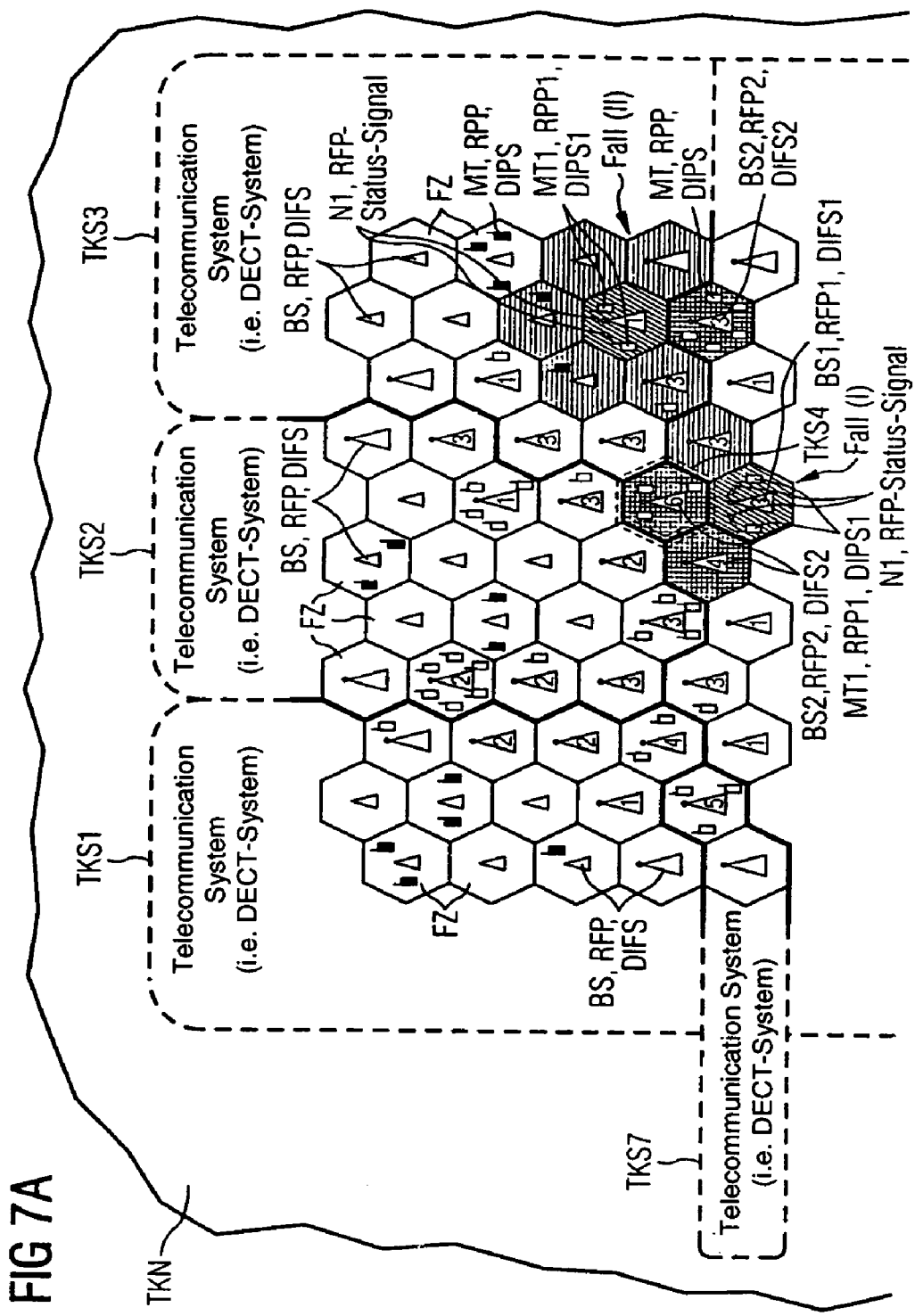

ROAMING OF MOBILE PARTS IN AT LEAST PARTIALLY ASYNCHRONOUS WIRELESS TELECOMMUNICATIONS NETWORKS, ESPECIALLY DECT NETWORKS

BACKGROUND OF THE INVENTION

1. Field of the Invention

The present invention relates generally to a telecommunication systems for wireless, at least partially asynchronous telecommunication networks, particularly DECT systems for at least partially asynchronous DECT networks.

2. Description of the Related Art

In message systems having a message transmission link between a message source and a message sink, transmission and reception devices are employed for message processing and transmission, whereby
1) the message processing and message transmission can ensue in a privileged transmission direction (simplex mode) or in both transmission directions (duplex mode);
2) the message processing is analog or digital;
3) the message transmission ensues wirelessly via the remote transmission link on the basis of various message transmission method FDMA (frequency division multiple access), TDMA (time division multiplex access) and/or CDMA (code division multiple access)—for example according to radio standards such as DECT, GSM, WACS or PACS, IS-54, IS-95, PHS, PDC, etc. [see IEEE Communications Magazine, January 1995, pages 50–57, D. D. Falconer et al, "Time Division Multiple Access Methods For Wireless Personal Communications"]—and/or ensues wire-bound.

"Message" is a higher-ranking term that stands both for the meaningful content (information) as well as for the physical representation (signal). Despite the same meaningful content of a message—i.e., the same information—different signal forms can occur. Thus, for example, a message directed to a subject can be transmitted
(1) in the form of an image,
(2) as a spoken word,
(3) as a written word,
(4) as an encrypted word or image. The transmission mode according to the foregoing forms (1) . . . (3) is thereby normally characterized by continuous (analog) signals, whereas discontinuous signals (for example, pulses, digital signals) usually arise in the transmission according to the above form (4).

Proceeding from this general definition of a message system, the invention relates to telecommunication systems for wireless, at least partially asynchronous telecommunication networks, particularly DECT systems for at least partially asynchronous DECT networks.

Telecommunication systems of the species defined above are, for example DECT systems [digital enhanced (earlier: European) cordless telecommunication; see (1): Nachrichtentechnik Elektronik 42 (1992) January/February, No. 1, Berlin, DE; U. Pilger "Struktur des DECT-Standards", pages 23 through 29 in conjunction with ETSI publication ETS 300175-1 . . . 9, October 1992; (2): Telcom Report 16 (1993), No. 1, J. H. Koch: "Digitaler Komfort für schnurlose Telekommunikation—DECT-Standard eröffnet neue Nutzungsgebiete", pages 26 and 27; (3): tec 2/93–the technical magazine of Ascom, "Wege zur universellen mobilen Telekommunikation", Pages 35 through 42; (4): Philips Telecommunication Review, Vol. 49, No. 3, September 1991, R. J. Mulder: "DECT, a universal cordless access system"; (5): WO 93/21719 (FIGS. 1 through 3 with appertaining description)] or GAP systems (Generic Access Profile: ETSI publication ETS 300444, December 1995, ETSI, FR) that, for example, can be constructed according to the illustration in FIG. 1. The GAP standard is a sub-set of the DECT standard which is assigned the task of assuring the inter-operability of the DECT air interface for telephone applications.

According to the DECT/GAP standard and the illustration in FIG. 1, a maximum of twelve connections can be set up in parallel to DECT/GAP mobile parts MT1 . . . MT12 at a DECT/GAP base station BS over a DECT/GAP air interface designed for the frequency range between 1.88 and 1.90 GHz, being set up according to the TDMA/FDMA/TDD method (Time Division Multiple Access/Frequency Division Multiple Access/Time Division Duplex). The number 12 derives from a plurality "k" of time slots or, respectively, telecommunication channels (k=12) available for the duplex mode of a DECT/GAP system. The connections can thereby be internal and/or external. Given an internal connection, two mobile parts, for example, the mobile part MT2 and the mobile part MT3, that are registered at the base station BS can communicate with one another. For a setup of an external connection, the base station BS is connected to a telecommunication network TKN, for example in linebound form via a telecommunication terminal unit TAE or, respectively, a private branch exchange NStA with a linebound telecommunication network or, according to published PCT patent application WO 95/05040, in wireless form as repeater station with a higher-ranking telecommunication network. Given the external connection, communication can be carried out with a mobile part, for example with the mobile part MT1, via the base station BS, the telecommunication terminal unit TAE or, respectively, private branch exchange NStA, communication being carried out with a subscriber in the telecommunication network TKN. When the base station BS—as in the case of the Gigaset 951 (Siemens cordless telephone, see Telcom Report 16, (1993) No. 1, pages 26 and 27)—has only one connection to the telecommunication terminal unit TAE or, respectively, the private branch exchange NStA, then only one external connection can be setup. When the base station BS—as in the case of the Gigaset 952 (Siemens Cordless Telephone; see Telcom Report 16 (1993), No. 1 pages 26 and 27)—has two connections to the telecommunication network TKN, then a further external connection from a line-bound telecommunication terminal equipment TKE connected to the base station BS is possible in addition to the external connection to the mobile part MT1. It is thereby also fundamentally conceivable that a second mobile part, for example, the mobile part MT12, uses the second connection for an external connection instead of the telecommunication terminal equipment TKE. Whereas the mobile parts MT1 . . . MT12 are operated with a battery or an accumulator, the base station BS fashioned as cordless, small-scale exchange is connected to a voltage network SPN via a network connection means NAG.

Proceeding from the publication components 31 (1993), No. 6, pages 215 through 218, S. Althammer, D. Brückmann, "Hochoptimierte IC's für DECT-Schmurlostelefone", FIG. 2 shows the fundamental circuit structure of the base station BS and of the mobile part MT. The base station BS and the mobile part M2 accordingly comprise a radio part FKT with an antenna allocated for the transmission and reception of radio signals, a signal processing means SVE and a central controller ZST that are connected to one another in the illustrated way. It is essentially the known devices such as transmitter SE, receiver EM and synthesizer SYN that are contained in the radio part FKT. Among other things, the signal processing means SVE contains an encoding/decoding means CODEC. The central controller ZST comprises a microprocessor $\mu P$ both for the base station BS as well as for the mobile part MT, said microproocessor $\mu P$ having a program module PGM constructed according to the OSI/ISO layer model (see (1): Unterrichtsblätter—Deutsche Telekom, Vol. 48, February/1995, pages 102 through 111; (2): ETSI Publication ETS 300175-1 . . . 9, October 1992], a memory SP for storing information intended for the base station BS or, respectively, the mobile part MT and a time counter ZZ, ZZ1, ZZ2 fashioned as a timer for determining base station-specific or, respectively, mobile part-specific time information, a signal control part SST and a digital signal processor DSP that are connected to one another in the illustrated way. Of the layers defined by the layer model, only the first four layers which are immediately critical for the base station BS and the mobile part MT are shown. The signal control part SST is implemented in the base station BS as a time switch controller TSC and is implemented in the mobile part MT as a burst controller BMC. The critical difference between the two signal control parts TSC, BMC is comprised therein that the base station-specific signal control part TSC assumes additional switching functions compared to the mobile part-specific signal control part BMC. The signal control parts TSC, BMA respectively contain a counting means ZE with a bit counter, time slot counter and time frame counter.

The basic functioning of the circuit units recited above is described, for example, in the above-cited publication components 31 (1993), No. 6, pages 215 through 218.

At the base station BS and the mobile part MT, the described circuit structure according to FIG. 2 is supplemented by additional function units in conformity with their function in the DECT/GAP system of FIG. 1.

The base station BS is connected via the signal processing means SVE and the telecommunication terminal unit TAE or, respectively, the private branch exchange NStA, being connected to the telecommunication network TKN. As an option, the base station BS can also comprise a user interface (function units entered with broken lines in FIG. 2) that, for example, is composed of an input means EE fashioned as a keyboard, of a display means AE fashioned as a display, a speaking/listening means SHE fashioned as a handset with a microphone MIF and an earphone HK as well as a call tone bell TRK.

The mobile part MT comprises the user interface possible as an option at the base station BS with the above-described operating elements belonging to this user interface.

FIG. 3, proceeding from the DECT system according to FIG. 1, shows a cellular DECT/GAP multi-system CMI (cordless multicell integration) wherein a plurality of the above-described DECT/GAP systems TKS each respectively having a base station BS and one or more mobile parts MT are present at an arbitrary geographical location, for example concentrated in an administration building with large-scale offices—in the sense of a "hot spot" arrangement. Instead of a "closed" geographical location like the administration building, however, an "open" geographical location with strategic telecommunication significance is also possible for the installation of a cellular DECT/GAP multi-system CMI, for example plazas in large cities having a high traffic volume, a high accumulation of commercial units and great movement of people. Some of the base station BS arranged in the large-scale office, differing from the base stations shown in FIGS. 1 and 2, are thereby fashioned according to published PCT patent application WO 94/10764 as antenna diversity base stations. The concentration of the DECT/GAP system TKS is thereby configured such (to provide gap-free radio coverage of the geographical location) such that individual DECT/GAP systems TKS work in the same environment due to the overlapping, cellular DECT/GAP radio areas FB.

Dependent on the degree of overlap, the same environment can thereby mean that
a) a first base station BS1 of a first telecommunication system TKS1 is arranged in a first radio area FB1 and a second base station BS2 of a second telecommunication system TKS2 is arranged in a second radio area FB2 and can set up telecommunication connections to at least one mobile part $MT_{1,2}$;
b) a third base station BS3 of a third telecommunication system TKS3 and a fourth base station BS4 of a fourth telecommunication system TKS4 are arranged in a shared, third radio area FB3 and can set up telecommunication connections to at least one mobile part $MT_{3,4}$.

The cordless telecommunication scenario shown in FIGS. 1 through 3, wherein DECT mobile parts can be connected via a DECT air interface to a private (residential) DECT base station (FIG. 1) or, respectively, to one or more private or public DECT base station (FIG. 3), can then be expanded according to the publication "presentation of A. Elberse, M. Barry, G. Fleming on the subject, "DECT Data Services—DECT in Fixed and Mobile Networks", 17/18 Jun. 1996, Hotel Sofitel, Paris; Pages 1 through 12 and summary, to the effect that the DECT mobile parts are connectible via the DECT air interface to private and public DECT base stations.

According to published PCT patent application WO 95/05040 (see FIGS. 3 through 8 therein with the respectively appertaining description), this scenario can then in turn be expanded in view of a universal mobile telecommunication system (UMTS) to the effect that pico-cell-related cordless telecommunication systems (for example, the previously discussed DECT systems from CTM points of view (cordless terminal mobility; see ETSI Publications (1): "IN Architecture and Functionality for the support of CTM", Draft Version 1.10, September 1995; (2): "Cordless Terminal Mobility (CTM)—Phase 1, Service Description", draft DE/NA-010039, Version 6, 2 Oct. 1995) be linked into a higher-ranking network infrastructure (for example, ISDN, PTSN, GSM and/or satellite networks) for accesses (see ETSI Publication, CTM Access Profile (CAP)", prETS 300824, November 1996). According to patent claim 1 of the international application WO95/05040, this can be achieved by a DECT base station fashioned as a DECT repeater. In a universal mobile telecommunication system, DECT is mainly understood as a "network access technology" for mobile communication services (see the presentation of A. Elberse, M. Barry, G. Fleming on the subject, "DECT Data Services—DECT in Fixed and Mobile Networks", 17/18 Jun. 1996, Hotel Sofitel, Paris; Pages 1 through 12 and summary) and not as a network.

Standing for the scenario presented above, FIG. 4—proceeding from the publications "Nachrichtentechnik Elektronik", Berlin 45, (1995), No. 1, Page 21 through 23 and No. 3, Pages 29 and 30, as well as IEE Colloqium 1993, 173; (1993), pages 29/1–29/7, W. Hing, F. Halsall: "Cordless access to the ISDN basic rate service" on the basis of a DECT/ISDN intermediate system DIIS according to ETSI Publication prETS—300822, February 1997—shows an ISDN↔DECT" Telecommunication system ID-TS (Integrated Services Digital Network↔Digital Enhanced Cordless Telecommunication) with an ISDN telecommunication sub-system I-TTS [see the publication "Nachrichtentechnik Elektronik", Berlin 41–43, Park: 1 through 10, T1: (1991) No. 3, pages 99 through 102; T2: (1991) No. 4, pages 138 through 143; T3: (1991) No. 5, Pages 179 through 182 and No. 6, pages 219 through 220; T4: (1991) No. 6, pages 220 through 222 and (1992) No. 1, pages 19 through 20; T5: (1992) No. 2, pages 59 through 62 and (1992) No. 3, pages 99 through 102; T6: (1992) No. 4, pages 150 through 153; T7: (1992) No. 6, pages 238 through 241; T8: (1993) No. 1, pages 29 through 33; T9: (1993) No. 2, pages 95 through 97 and (1993) No. 3, pages 129 through 135; T10: (1993) No. 4, pages 187 through 190] and a DECT telecommunication sub-system D-TTS.

As shall be explained in greater detail below, the DECT telecommunication sub-system D-TTS can thereby be a component part of a DECT/ISDN intermediate system DIIS or, respectively, of a RLL/WLL telecommunication sub-system RW-TTS. The DECT telecommunication sub-system D-TTS and, thus, the DECT/ISDN intermediate system DIIS or, respectively, the RLL/WLL telecommunication sub-system RW-TTS are preferably based on a DECT/GAP system GDS as shown, for example, in FIG. 1.

Alternatively, the DECT/ISDN intermediate system DIIS or, respectively, the RLL/WLL telecommunication sub-system RW-TTS can also be based on a GSM system (global system for mobile communication; see Informatik Spektrum 14 (1991) June, No. 3, Berlin, DE; A. Mann: "Der GSM-Standard—Grundlage für digitale europäische Mobilfunknetze", pages 137 through 152). Instead, it is also possible within the scope of a hybrid telecommunication system that the ISDN telecommunication system I-TTS is fashioned as a GSM system or as a PSTN system (public switched telecommunications network).

Coming into consideration over and above this as further possibilities for the realization of the DECT/ISDN intermediate system DIIS or, respectively, of the RLL/WLL telecommunication sub-system RW-TTS or of the ISDN telecommunication sub-system I-TTS of the initially cited systems as well as future systems that are based on known multiple access methods FDMA, TDMA, CDMA (Frequency Division Multiple Access, Time Division Multiple Access, Code Division Multiple Access) and hybrid multiple access methods formed therefrom.

The employment of radio channels (for example DECT channels) in classic line-bound telecommunication systems such as the ISDN (RLL/WLL scenario) is gaining increasingly in significance, particularly as viewed with the background of future, alternative network operators without their own complete wire network.

Given, for example, the RLL/WLL telecommunication sub-system RW-TTS, thus, the wireless connection technique RLL/WLL (radio in the local loop/wireless in the local loop) shall make ISDN services available to the ISDN subscriber at standard ISDN interfaces, for example upon involvement of the DECT system DS (see FIG. 4).

In the ISDN↔DECT telecommunication system ID-TS according to FIG. 4, a first telecommunication subscriber (user) TCU1 (telecommunication user) has his terminal equipment TE (terminal endpoint; terminal equipment) linked into the ISDN world with the services available therein, for example, via a standardized S-interface (S-bus), the DECT/ISDN intermediate system DIIS fashioned as local message transmission loop—preferably DECT-specific and contained in the RLL/WLL telecommunication sub-system RW-TTS—a network termination NT, and a standardized U-interface of the ISDN telecommunication sub-system I-TTS and, second, a second telecommunication subscriber TCU2 is also linked into said ISDN world with the services available therein as ultimate user of the DECT/ISDN intermediate system DIIS.

The DECT/ISDN intermediate system DIIS is essentially composed of two telecommunication interfaces, of a first telecommunication interface DIFS (DECT intermediate fixed system) and of a second telecommunication interface DIPS (DECT intermediate portable system) that are wireless connected to one another, for example via a DECT air interface. Due to the quasi-location-bound, first telecommunication interface DIFS, the DECT/ISDN intermediate system DIIS forms the local message transmission loop defined above in this context. The first telecommunication interface DIIS contains a radio fixed part RFP, an interworking unit IWU1 and an interface circuit INC1 to the S-interface. The second telecommunication interface DIPS contains a radio portable part RPP and an interworking unit IWU2 and, potentially, an interface circuit TNC2 to the S-interface. The radio fixed part RFP and the radio portable RPP thereby form the known DECT/GAP system DGS.

As already mentioned, FIG. 4 shows, first, (first possibility), how the DECT/ISDN intermediate system DIIS is linked into the ISDN telecommunication sub-system I-TTS as a local message transmission loop within the framework of the RLL/WLL telecommunication sub-system RW-TTS as typical RLL/WLL scenario and, second (second possibility), how the DECT/ISDN intermediate system DIIS is only connected to the ISDN telecommunication sub-system I-TTS at the network side as seen from GAP points of view (cordless terminal ability access profiles). Given the second possibility, the interface circuit INC2 of the second telecommunication interface DIPS to the S-interface is not active or is not present at all. In order to graphically present and support this situation overall, the interface circuit INC2 of the second telecommunication interface DIPS is shown with broken lines. Whereas the second telecommunication interface DIPS given the first possibility, for example, is not fashioned mobile part-specific, i.e. with a user interface, the second telecommunication interface DIPS in the second possibility is fashioned as a typical mobile part with a user interface.

Based on the publication, "Nachrichtentechnik Elektronik" 42 (1992) January/February, No. 1, Berlin, DE, U. Pilger, "Struktur des DECT-Standards", pages 23 through 29 in conjunction with ETS 300 175-1 . . . 9, October 1992, FIG. 5 shows the TDMA structure of the DECT/GAP system DGS. The DECT/GAP system is a hybrid system with respect to the multiple access methods, whereby radio messages according to the TDMA principle according to FIG. 5 can be sent in a predetermined time sequence from the base station BS to the mobile part MT and from the mobile part MT to the base station BS (time division duplex mode) according to the FDMA principle on ten frequencies in the frequency band between 1.88 and 1.9 GHZ. The time sequence is thereby defined by a multi-time frame MZR that occurs every 160 ns and that comprises 16 time frames ZR each respectively having a time duration of 10 ms. Information that relate to a C, M, N, P, Q channel defined in the DECT standard are separately transmitted in this time frame ZR to the base station BS and mobile part MT. When information for a plurality of these channels are transmitted in one time frame ZR, then the transmission ensues according to a priority list with M>C>N and P>N. Each of the sixteen time frames ZR of the multi-time frame MZR is in turn divided into twenty-four time slots ZS, each having a respective time duration of 417 μs, each having a respective time duration 417 µs, whereof 12 times ZS (time slots 0 . . . 11) are intended for the transmission direction base station BS→mobile part MT and another 12 time slots ZS (time slots 12 . . . 23) are intended for the transmission direction mobile part MT→base station BS. Information having a bit length of 480 bits are transmitted according to DECT standard in each of these time slots ZS. Of these 480 bits, 32 bits are transmitted as synchronization information in a sync field and 388 bits are transmitted as payload information in a D-field. The remaining 60 bits are transmitted as auxiliary information in a Z-field and as protective information in a "guard time" field. The 388 bits of the D-field transmitted as payload information are in turn subdivided into an A-field 64 bits long, a B-field 320 bits long and an "X-CRC" word 4 bits long. The 64 bit long A-field is composed of an 8 bit long data header, a 40 bit long data set with data for the C, Q, M, N, P channels and of a 16 bit long "A-CRC" word.

For setting up telecommunication connections between the base station or stations BS and the mobile part MT in the DECT systems according to FIGS. 1 through 5, the procedure described below is provided according to the DECT standard.

The base station BS (radio fixed part RFP) according to FIGS. 1 through 5 sends broadcast information via the DECT air interface at regular time intervals on simplex transmission paths, what are referred to as dummy bearers, these broadcast information being received by the mobile part MT (radio portable RPP) according to FIGS. 1 through 5 and serving the mobile part MT for synchronization and call setup with the base station. The broadcast information need not necessarily be transmitted on dummy bearers.

It is also possible that no dummy bearer is present because the base station is already maintaining at least one telecommunication connection, what is referred to as a traffic bearer, to another mobile part, and it then sends the necessary broadcast information thereon. In this case, the mobile part MT, RPP that would like to have a telecommunication connection to the base station BS, RFP receives the broadcast information—as in the transmission of the broadcast information on the dummy bearer.

According to ETSI publication ETS 300175-3, October 1992, Chapter 9.1.1.1, the broadcast information contain information about access rights, system information and paging information.

As already mentioned, DECT in a universal mobile telecommunication system is mainly understood as a "network access technology" for mobile communication services (see the presentation of A. Elberse, M. Barry, G. Fleming on the subject, "DECT Data Services—DECT in Fixed and Mobile Networks", 17/18 Jun. 1996, Hotel Sofitel, Paris; Pages 1 through 12 and summary) and not as a network. On the basis of the above discussion of various telecommunication systems, however, anyone can become his own network operator by acquiring a DECT systems that is customized for the respective requirements and, thus, differently configured.

In order to thereby be able to forego the network coordination, the DECT standard provides the dynamic channel allocation method (DCA method). When, for example, a DECT connection is set up, that frequency and that time window having the least interference is sought. The height (strength) of the interference is mainly dependent on whether (a) a conversation is already being carried out at a different base station or (b) a mobile part, due to movement, comes into visual contact with a previously occluded base station.

A boost in the interference deriving therefrom can be countered with the TDMA transmission method on which the DECT cordless telephone system is based. According to the TDMA method, only one time slot is used for the actual transmission; the other eleven time slots can be employed for measurements. As a result thereof, an alternative frequency/time slot pair can be determined onto which the connection can be switched. This occurs in the framework of an adaptive channel allocation according to the DECT standard (see Nachrichtentechnik Elektronik 42 (January/February 1992), No. 1, Berlin, U. Pilger, "Struktur des DECT-Standards", pages 28, point 3.2.6) on the basis of a "connection handover" (Intra-Cell handover).

In addition to this "Intra-Cell Handover", the "inter-cell handover" or, respectively, the seamless handover should also be cited, this likewise being possible within the framework of the DECT-specific, adaptive channel allocation.

In order to get a handle on the regularly occurring "inter-cell handover" problem that particularly occurs in cellular, wireless telecommunication systems, the mobile radio reception device (mobile part) provided for such cellular radio telecommunication systems must be in the position at every time of an active telecommunication connection to a (quasi) stationary radio transmission device (base station) to change the base station due to a change in cell within the cellular radio system (setup of a telecommunication connection to a different base station) and to thereby hand the already existing, active telecommunication connection over to the other base station interruption-free (seamlessly; seamless handover).

According to the publication, Nachrichtentechnik Elektronik 42 (January/February 1992), No. 1, Berlin, U. Pilger, "Struktur des DECT-Standards", pages 28, point 3.2.6, the DECT standard provides for this purpose that the mobile part, given a deterioration of the transmission quality of the existing telecommunication connection, sets up a second telecommunication connection parallel to the existing connecting on the basis of indicators indicating the transmission quality (for example, signal field strength, CRC values, etc.). Given this "inter-cell handover" procedure, the fact that DECT mobile parts are constantly informed about the status of the channels available in the momentary environment within the framework of the dynamic, decentralized channel allocation (DCA method) such that the second connection is setup on the basis of the entry in a channel list.

An interruption-free handover is only possible with the above procedure when the mobile part is located in a cellular radio system having synchronized base stations. In such a synchronous, cellular radio system, the mobile part can then—in addition to the telecommunication connection to a base station (originating base station) that already exists—setup at least one further connection to a different base station in a different radio cell without thereby losing the synchronism of the originating base station. Such a synchronous cellular radio system, however, can only be realized with substantial system outlay (cable or radio synchronization).

A synchronization will be foregone and asynchronous relationships will be accepted wherever the outlay for the realization of a synchronous cellular radio system is not justified, for example, for cost reasons.

FIG. 6 shows an at least partially asynchronous, wireless telecommunication network TKN preferably fashioned as DECT network that contains a plurality of wireless telecommunication systems TKS1 . . . TKSn preferably fashioned as DECT systems (for example, according to FIG. 1 through 5).

Each telecommunication system TKS1 . . . TKSn comprises a plurality of base stations BS, RFP, DIFS arranged in radio cells FZ that are connectible by wireless telecommunication (for example, according to the DECT air interface protocol) with mobile parts MT, RPP, DIPS (roaming radio mobile part) residing or, respectively, moving independently of location in the telecommunication systems TKS1 . . . TKSn and in the telecommunication network TKN. The radio cells FZ in the telecommunication system TKS1 . . . TKSn are combined to form what is referred to as a radio cluster that, for example, is composed of base stations BS, RFP, DIFS, synchronized with one another. The radio cells FZ are hexagonally shown (honeycomb-shaped) in order, on the one hand, to be able to graphically show a 100% radio coverage and, on the other hand, to obtain a surveyable illustration. The circular radio area of a base station respectively deriving under ideal geographical and physical conditions is shown for radio cells FZ' standing for all radio cells FZ. In this illustration, respectively overlapping or, respectively, intersecting radio areas (overlap or, respectively, intersection areas) derive. The "roaming" mobile parts—dependent on the plurality of overlapping or, respectively, intersecting radio areas, can setup radio connections to a plurality of base stations and potentially maintain them in these overlap or, respectively, intersection areas.

The special characteristic of the illustrated telecommunication network TKN is then comprised therein that the base stations BS, RFP, DIFS in the individual telecommunication systems TKS1 . . . TKSn are in face synchronized with one another but that the individual telecommunication systems TKS1 . . . TKSn are either not synchronized at all or only partially synchronized (at least partially asynchronous telecommunication network TKN). In the illustrated case, first telecommunication systems TKS1 . . . TKS7 are not synchronized, i.e. are asynchronous relative to one another, whereas second telecommunication systems TKSn-2, TKSN-1, TKSn are synchronized with one another for illustrating this situation. In the present telecommunication network TKN, accordingly, there are base stations in the edge areas of the first telecommunication systems TKS1 . . . TKS7 wherein at least one neighboring base station among respectively neighboring base stations is not synchronized with the appertaining base station, i.e. is asynchronous.

The current situation with respect to "roaming" of the mobile parts MT, RPP, DIPS in such at least partially asynchronous telecommunication networks TKN takes on the following form:

Mobile parts presently obtainable in the marketplace (for example, the Siemens mobile part "Gigaset 1000C or 1000S" or other DECT/GAP terminal devices) allocate themselves, for example in the idle lock mode (see ETSI publication ETS 300175-3, October 1992, Chapter 4.3.1) to that base station among all possible base stations that can be received at a location that, for example, is received with the greatest field strength. Alternatively, the transmitted CRC values or, respectively, a combination of both possibilities is also available as a decision criterion for the allocation to a base station. When the mobile part has allocated itself to a base station, then the mobile part allocates itself to another base station when the reception quality of the allocated base station becomes poorer. Two cases are distinguished in the allocation to a new base station:

1. The reception quality of the current base station deteriorates so greatly that the mobile part loses radio contact with the allocated base station, and synchronization with the base station can no longer be maintained due to the poor reception quality. In this case, the mobile part switches into what is referred to as a "free run scan mode" and attempts to synchronize to the base station received best from all received base stations.

2. The quality of the allocated base station becomes poorer but radio contact with the previously allocated base station does not break off, i.e. the mobile part receives the signals of the base station with poor quality but is still synchronized to the allocated base station. In this case, the mobile part searches for neighboring base stations that are synchronized in terms of widths, time slot and/or time frame with the allocated base station and that can be received by the mobile part with better quality. When the mobile part finds no better base stations in view of the indicated synchronism criteria, the mobile part remains allocated to the previous base station, even when the reception quality of this allocated base station becomes poor.

The disadvantage is case 2 is comprised therein that, when there is a neighboring base station asynchronous in view of the indicated that is synchronism criteria that the mobile part would receive with better quality, the mobile part will not find this asynchronous base station since it can only locate synchronous base stations as long as there is radio contact with the allocated base station and the synchronization is not lost.

Published PCT patent application WO 97/15160 discloses a telecommunication system with base stations and at least one mobile part wherein the radio environment is scanned for synchronous or asynchronous radio connections. A handover to a synchronous connection ensues seamlessly, and, given a handover in an asynchronous radio environment, a connection of a mobile station to a first base station is handed over to a second base station in that the transmission of the mobile station via a first radio connection is interrupted, whereas the first base station contains to maintain the transmission via the first radio connection, and, subsequently, a second radio connection from the mobile station to the second base station is set up and the connection is continued via this radio connection after the radio connection from the first base station has been released.

SUMMARY OF THE INVENTION

U.S. Pat. No. 5,448,569 discloses a method or, respectively, arrangement in a wireless communication network with mobile stations and base stations wherein, first, the mobile station is in the position of acquiring the quality of the connection that it maintains with a first base station and, second, steps or, respectively, means are offered with which this connection is handed over to a second base station when the acquired quality falls below a predetermined value.

The object underlying the invention is comprised in qualitatively improving the roaming of mobile parts in at least partially asynchronous wireless telecommunication networks.

Proceeding from the telecommunication system for wireless, at least partially asynchronous telecommunication networks, particularly DECT systems for at least partially asynchronous DECT networks, this object is achieved by first base stations that are synchronous with first mobile parts and in whose proximity at least respectively one second base station that is/are respectively asynchronous relative to the first base stations is arranged, whereby the base stations and first mobile stations are connectible by the wireless transmission of messages, in that first messages having first information are at least temporarily sent at least from one part of the first base stations, whereby the information indicate that the first base stations are respectively surrounded by at least one of the second base stations.

The idea underlying the invention as first set forth is comprised in improving the roaming of mobile parts in an at least partially asynchronous, wireless telecommunication network with telecommunication systems having a plurality of base stations of the initially outlined species arranged in radio cells, first base stations or a part of these first base stations to which at least one asynchronous, second base station is respectively proximate send information to first mobile parts connectible by telecommunication with the first base stations that indicate that the respective, first base station sending the information is surrounded by at least one second base station.

Given DECT base stations, the transmitted information are RFP status signals transmitted on broadcast channels (see ETSI publication ETS-300175-3, October 1992, Chapter 7.2.4.3.9) that contain corresponding signal information.

In an embodiment wherein the first mobile parts—after receiving the first message—become asynchronous relative to the first base stations for a predetermined time span dependent on mobile part location-specific reception criteria in order to search for second base stations, it is advantageous when the first mobile parts, given a certain deterioration of the reception quality, briefly leave radio contact or, respectively, the synchronization after receiving the information (for a predetermined, short time span) in order to also seek asynchronous base stations and, thus, improve the quality of the radio contact. In this way, the first mobile parts have knowledge that at least one asynchronous, second base station is also located in the proximity in addition to the synchronous, first base stations or that only an asynchronous, second base station is also located in the proximity in addition to the synchronous, first base stations or that only a synchronous, second base stations are located therein.

When the connection to the allocated, first base station becomes poor and when the first mobile part has detected the RFP station signal "asynchronous, second base station present", then, in an embodiment having the first mobile parts are respectively asynchronous relative to the first base stations in view of the bit, time slot and/or time frame synchronism the following algorithm can run in the first mobile part, based on the published PCT patent application WO 96/38991 (see, for example, FIG. 9):

When the first mobile part finds no better, synchronous, first base station and when the connection becomes poorer for a certain time, for example when the reception level lies below a predetermined threshold for a certain time interval, then the mobile part should switch to the "free run scan mode" and seek the neighboring, asynchronous, second base station or stations or, respectively, the strongest base station. When the search for other base stations is not successful then the mobile part can return to the old base station since it still represents the base station received best. The search for a synchronous, second base station can be re-initiated after the expiration of a second time counter (timer) of, for example, five seconds, even though there is still radio contact and in case the quality of the newly allocated base station deteriorates. This second time counter is intended to prevent the mobile part from changing back and forth at the boundaries of the radio coverage areas of asynchronous base stations, which can mean an increased signaling load for a network coupled to the base stations.

When, in contrast, the network is composed only of asynchronous, second base stations such as, for example, a plurality of "residential" ISDN base stations at a $S_o$ bus [see published PCT patent application WO 96/38990 (FIGS. 5 and 6 with the respectively appertaining description)], then the mobile part can be configured such—for example on the basis of an internal menu (menu point: multi-cell configuration) that the mobile part should always enter into what is referred to as the "free run scan load" in order to localize the neighboring asynchronous base stations and allocate thereto when the connection becomes poorer without losing radio contact or, respectively, synchronization with the allocated base station.

Further advantageous developments of the invention are provided by a telecommunication systems wherein the synchronism between the first base stations and the first mobile parts exists in the idle locked mode of the first mobile parts. The synchronism between the first base stations and the first mobile parts may exist in the active locked mode of the first mobile parts. In one embodiment, the telecommunication systems are TDMA-based telecommunication systems. The first base stations are respectively asynchronous relative to the second base station or stations in view of the bit, time slot and/or time frame synchronism. One feature provides that the part of the first base stations regularly sends the first messages with the first information. The part of the first base stations may automatically send the first messages with the first information. According to the invention, the part of the first base stations is initiated by the network side to send the first messages with the first information. In particular, the first mobile parts interrupt the search for a predetermined time span after they have searched for the second base stations. Specifically, the first mobile parts comprise time counters for acquiring the time span. Preferably, the first base stations load the time counters of the first mobile parts with the predetermined time span as start value on the basis of the wireless transmission of the messages. The first base stations comprise memories wherein the time spans are stored. The time span can be delivered to the first base stations from the network side. In the telecommunication systems, the time span is a multiple of the time slot or time frame. The first mobile parts repeat the search procedures at regular time intervals given unsuccessful attempts to seek the second base stations. The mobile location-specific reception criteria are the downward transgression of mobile part location-specific reception field strength thresholds. The mobile part location-specific reception field strength thresholds and threshold for initiation of inter-cell handover are of the same size.

BRIEF DESCRIPTION OF THE DRAWINGS

FIG. 1 illustrates connections in an exemplary telecommunication system operating in accordance with the DECT/GAP standard;

FIG. 3 illustrates an exemplary cellular DECT/GAP multi-system cordless multicell integration (CMI) according to the embodiment of FIG. 1;

FIG. 4 illustrates an exemplary ISDN DECT telecommunication system under an exemplary embodiment;

FIGS. 7A–7B, illustrate an exemplary wireless telecommunication system network that is at least partially asynchronous, where telecommunication systems are asynchronous relative to one another.

DETAILED DESCRIPTION OF THE PREFERRED EMBODIMENTS

Figure 2:
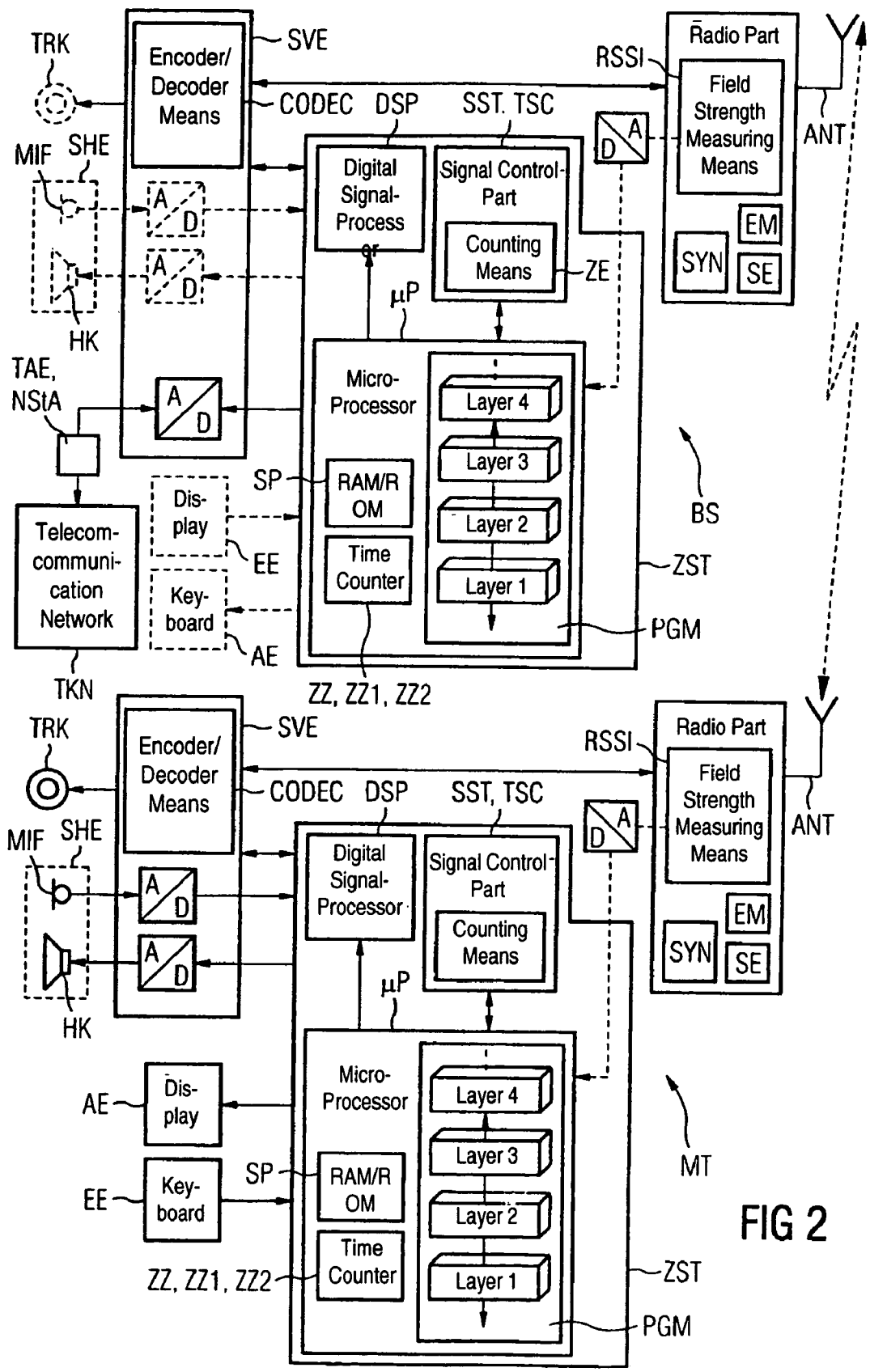
FIG. 2 illustrates additional functional units and an exemplary circuit structures according to the embodiment of FIG. 1.
Figure 5:
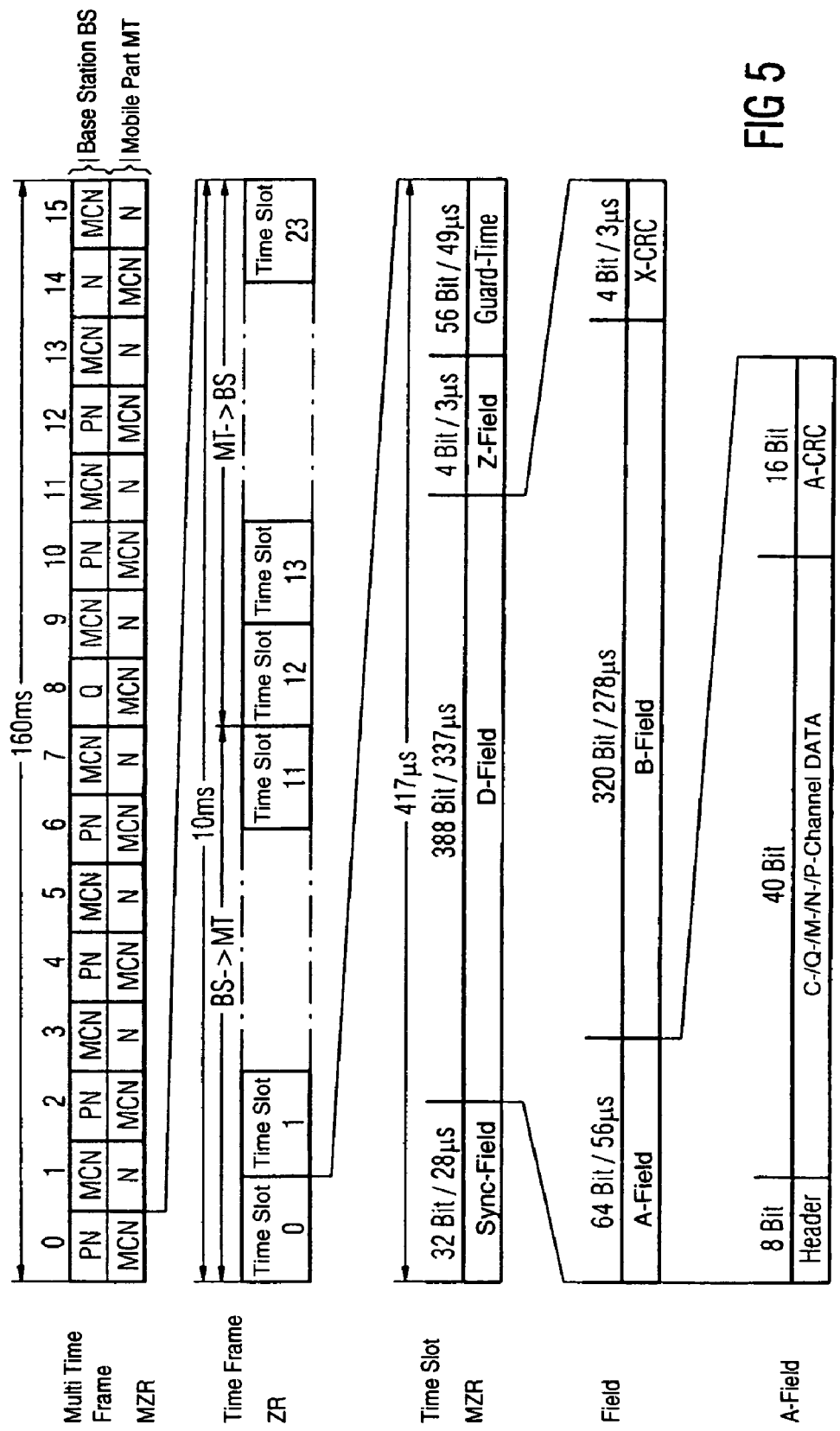
FIG. 5 illustrates an exemplary TDMA structure of the DECT/GAP system.
Figure 6A:
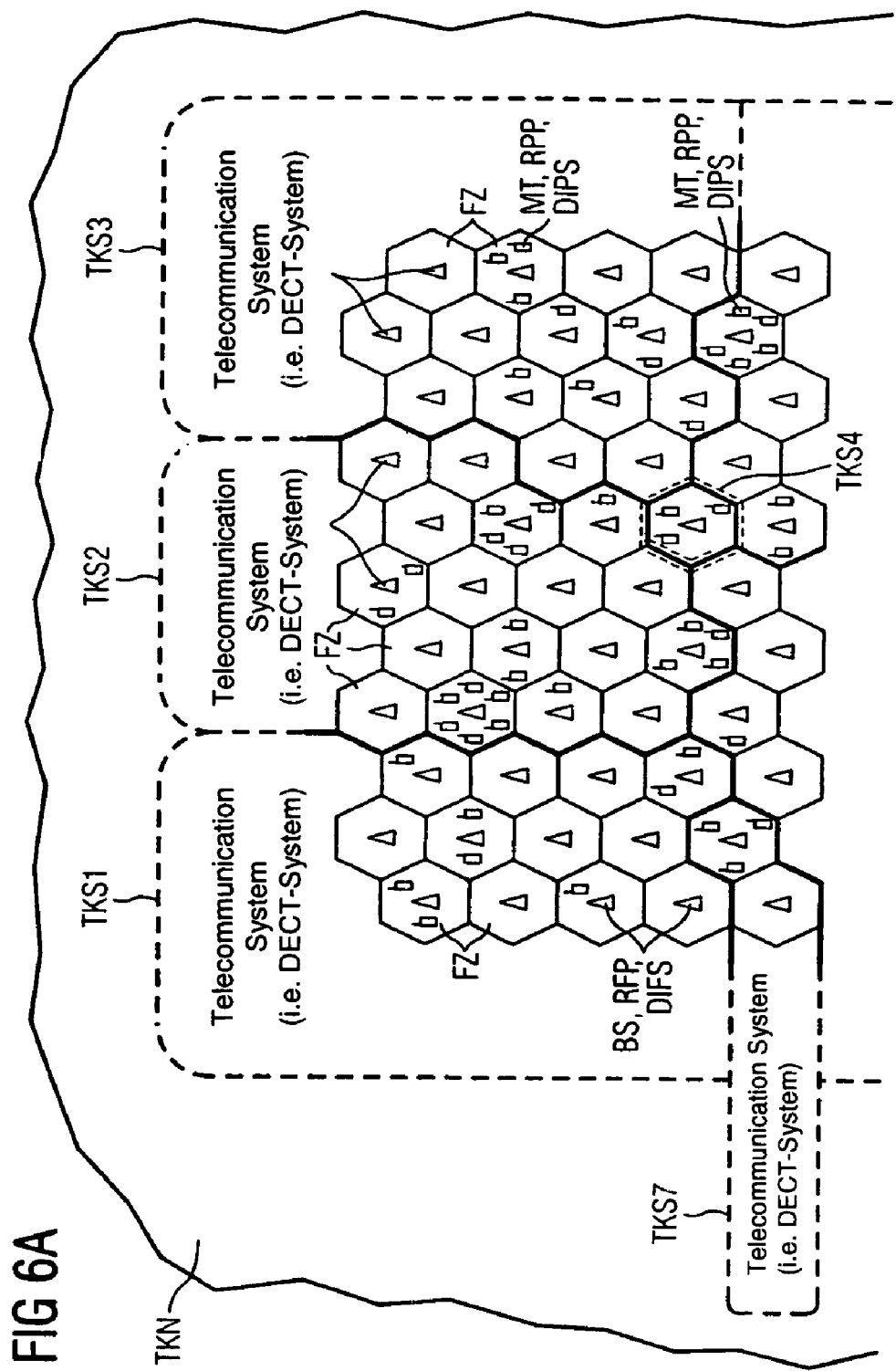
FIGS. 6A–6B illustrates an exemplary wireless telecommunication system network that is at least partially asynchronous.
Figure 6B:
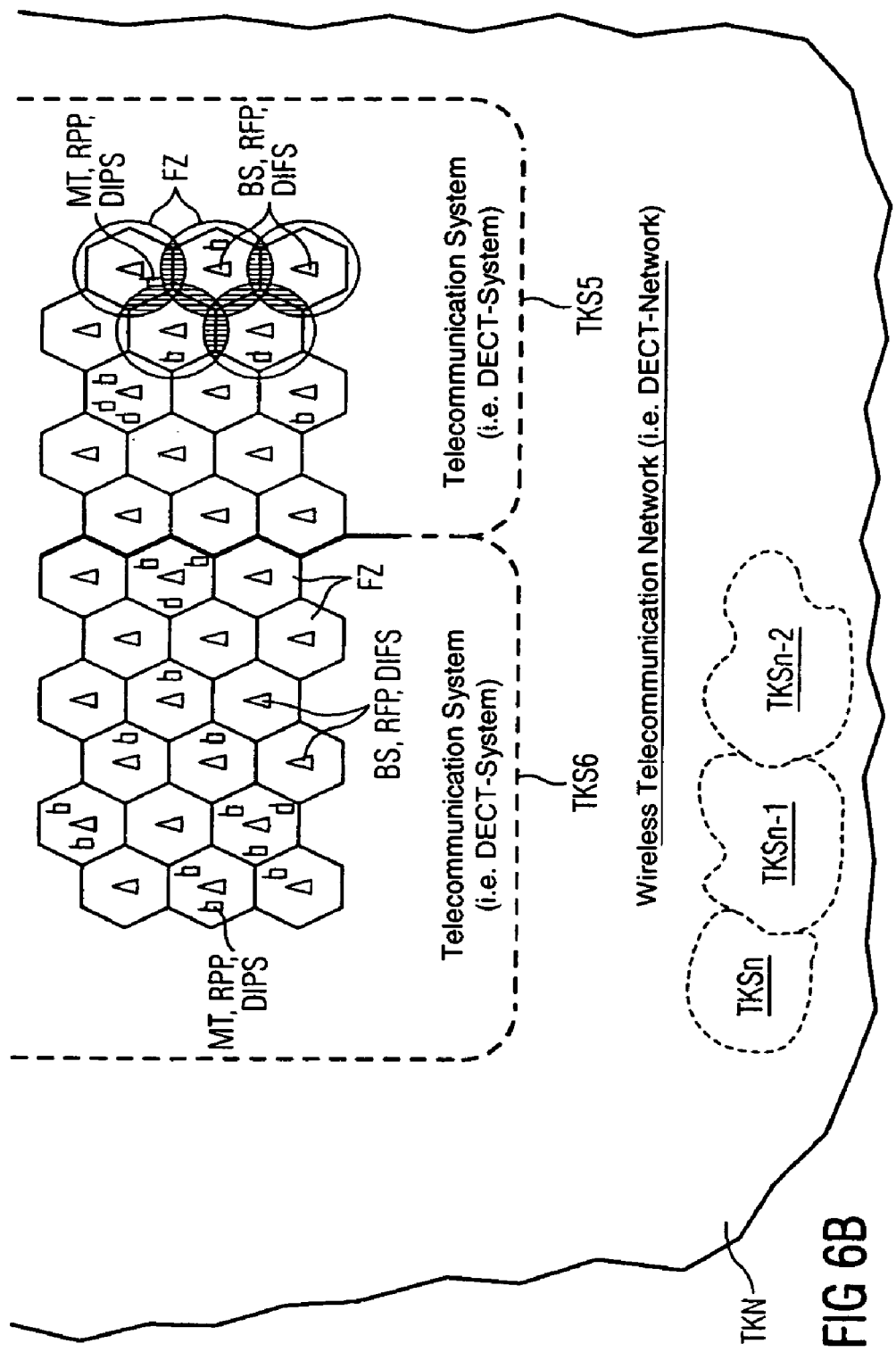
Figure 7B:
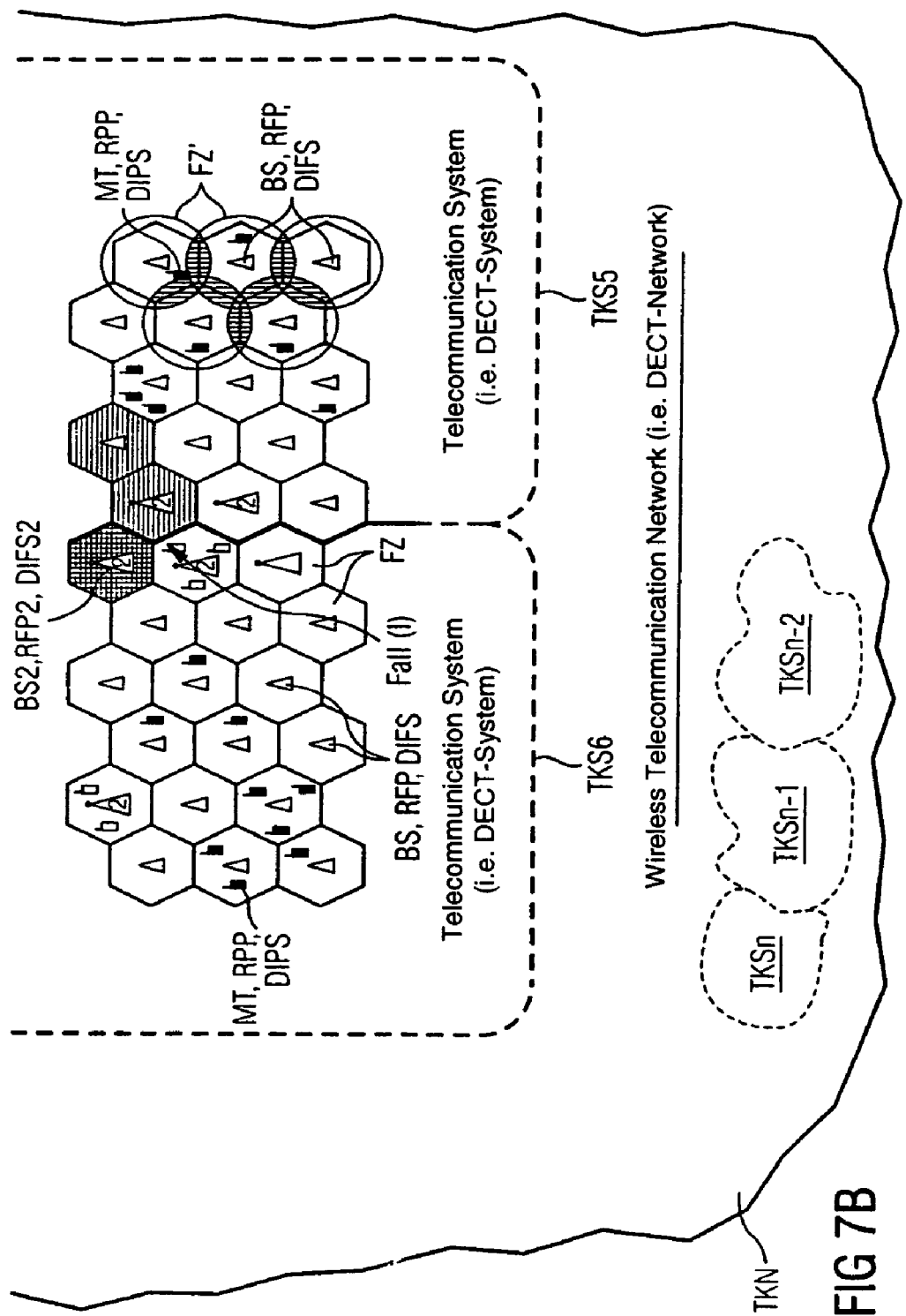

Proceeding from FIG. 6, FIG. 7 shows the at least partially asynchronous, wireless telecommunication network TKN preferably a DECT network that, in particular, contains the plurality of wireless, first telecommunication systems TKS1 . . . TKS7 preferably fashioned (for example, according to FIGS. 1 through 5) as DECT systems that are not synchronized, i.e. are asynchronous relative to one another. In the boundary areas in the first telecommunication systems TKS1 . . . TKS7, there are then—shown with reference to two instances, case (I) and case (II) standing for the plurality of identical cases in the telecommunication network TKN—first base stations BS1, RFP1, DIFS1 (upwardly diagonally hatched radio cells FZ) whereat at least one neighboring, second base station BS2, RFP2, DIFS2 (horizontally and vertically hatched radio cells FZ) of respectively neighboring base stations (horizontally hatched radio cells FZ) are not synchronous, i.e. are asynchronous relative to the first base stations BS1, RFB1, DIFS1 and that are synchronous with first mobile parts MT1, RPP1, DIPS1 or, respectively—formulated broadly in other words—that are connected to the first mobile parts MT1, RPP1, DIPS1 by the transmission of messages (for example DECT messages according to the DECT air interface protocol; see ETSI publication ETS 300175-1 . . . 9, October 1992) or, respectively, by telecommunication. What synchronous thereby means is that for example, the first mobile parts MT1, RPP1, DIPS1 can be in an idle lock mode and/or in an active locked mode according to the DECT standard (see ETSI publication ETS 300175-3, October 1992, Chapter 4.3.1). A natural number in the "triangle symbol" that is employed as identifier of the first base stations BS1, RFP1, DIFS1 indicates how many of the second base stations BS2, RFP2, DIFS2 neighbor the first base station BS1, RFP1, DIFS1. In case (I), there are "3" second base stations BS2, RFP2, DIFS2, whereas there is "1" second base station BS2, RFP2, DIFS2 in case (II). These respective information, as respectively first information "at least one asynchronous base station present" are the content of first messages that are transmitted from the first base stations BS1, RFP1, DIFS1 to the first mobile parts MT1, RPP1, DIPS1—given DECT base stations—with RFP status signals transmitted on broadcast channels (see ETSI publication ETS-300175-1, October 1992, Chapter 7.2.4.3.9).

The transmission of the first messages N1 (RFP status signal with the first information "at least one asynchronous base station present") can advantageously ensue controlled by the telecommunication network TKN and/or by the respective telecommunication systems TKS1 . . . TKS7 and/or automatically, for example at regular time intervals.

In this way, the first mobile parts MT1, RPP1, DIPS1 know that—in addition to the synchronous, first base stations—at least one asynchronous second base station BS2, RFP2, DIF2 is also located in the proximity or only a synchronous, second base stations BS2, RFP2, DIFS2 are located therein.

When the connection to the allocated, first base stations BS1, RFP1, DIFS1 become poorer and when the first mobile parts MT1, RPP1, DIPS1 have respectively detected the RFP status signal "asynchronous second base station present", then the following algorithm can run in first mobile parts MT1, RPP1, DIPS1, for example based on published PCT patent application WO 96/38991 (see, for example, FIG. 9):

When the first mobile part finds no better, synchronous, first base station and when the connection becomes poorer for a certain time, for example when the reception level lies below a predetermined threshold for a certain time interval, then the mobile part should switch to the "free run scan mode" and seek the neighboring, asynchronous, second base station or stations or, respectively, the strongest base station. When the search for other base stations is not successful then the mobile part can return to the old base station since it still represents the base station received best. The search for a synchronous, second base station can be re-initiated after the expiration of the first timer ZZ1 (timer) of, for example, five minutes.

When the mobile part has found an asynchronous, second base station, then it should in turn seek further, asynchronous second base stations only after the expiration of the second time counter ZZ2 (timer) of, for example, five seconds, even though there is still radio contact and in case the quality of the newly allocated base station deteriorates. This second time counter is intended to prevent the mobile part from changing back and forth at the boundaries of the radio coverage areas of asynchronous base stations, which can mean an increased signaling load for a network coupled to the base stations.

When, in contrast, the network is composed only of asynchronous, second base stations such as, for example, a plurality of "residential" ISDN base stations at a $S_o$ bus [see international WO 96/38990 (FIGS. 5 and 6 with the respectively appertaining description)], then the mobile part can be configured such—for example on the basis of an internal menu (menu point: multi-cell configuration) that the mobile part should always enter into what is referred to as the "free run scan load" in order to localize the neighboring asynchronous base stations and allocate thereto when the connection becomes poorer without losing radio contact or, respectively, synchronization with the allocated base station.

Although other modifications and changes may be suggested by those skilled in the art, it is the intention of the inventors to embody within the patent warranted hereon all changes and modifications as reasonably and properly come within the scope of their contribution to the art.

What is claimed is:

1. A telecommunication system for wireless, at least partially asynchronous telecommunication networks, comprising:
   first mobile parts;
   first base stations that are synchronous with said first mobile parts;
   at least one second base station that is asynchronous relative to the first base stations, said at least one second base station being in proximity of said first base stations;
   said first and second base stations and said first mobile parts being connectible by wireless transmission of messages; and
   first messages having first information are at least temporarily sent at least from one part of the first base stations, said first information including data that indicates that the at least one of the second base stations is in proximity to the first base stations.

2. A telecommunication system according to claim 1, wherein synchronism between the first base stations and the first mobile parts exists in an idle locked mode of the first mobile parts.

3. A telecommunication system according to claim 1, wherein synchronism between the first base stations and the first mobile parts exists in an active locked mode of the first mobile parts.

4. A telecommunication system according to claim 1, wherein the telecommunication system is a TDMA-based telecommunication system.

5. A telecommunication system according to claim 4, wherein the first base stations are respectively asynchronous relative to the second base station or stations in view of at least one of bit, time slot and time frame synchronism.

6. A telecommunication system according to claim 1, wherein the part of the first base stations regularly sends the first messages with the first information.

7. A telecommunication system according to claim 1, wherein part of the first base stations automatically sends the first messages with the first information.

8. A telecommunication system according to claim 1, wherein part of the first base stations is initiated by a network side to send the first messages with the first information.

9. A telecommunication system according to claim 1, wherein the first mobile parts—after receiving the first messages—become asynchronous relative to the first base stations for a predetermined time span dependent on mobile part location-specific reception criteria in order to search for said second base stations.

10. A telecommunication system according to claim 4, wherein the first mobile parts are respectively asynchronous relative to the first base stations in view of at least one of bit, time slot and time frame synchronism.

11. A telecommunication system according to claim 9, wherein the first mobile parts interrupt a search for a predetermined time span after they have searched for the second base stations.

12. A telecommunication system according to claim 11, wherein the first mobile include time counters for acquiring the predetermined time span.

13. A telecommunication system according to claim 12, wherein the first base stations load the time counters of the first mobile parts with the predetermined time span as a start value on a basis of the wireless transmission of the messages.

14. A telecommunication system according to claim 13, wherein the first base stations include memories wherein the predetermined time span is stored.

15. A telecommunication system according to claim 13, wherein the predetermined time span is delivered to the first base stations from a network side.

16. A telecommunication system according to claim 9, wherein the predetermined time span is a multiple of one of the time slot and time frame.

17. A telecommunication system according to claim 9, wherein the first mobile parts repeat the search procedures at regular time intervals given unsuccessful attempts to seek the second base stations.

18. A telecommunication system according to claim 9, wherein the mobile location-specific reception criteria are a downward transgression of mobile part location-specific reception field strength thresholds.

19. A telecommunication system according to claim 18, wherein the mobile part location specific reception field strength thresholds and threshold for initiation of inter-cell handover are of a same size.

20. A system comprising:
a wireless, at least partially asynchronous, telecommunication network, said wireless telecommunication network having first mobile parts;
first base stations, located in said network, that are synchronous with said first mobile parts;
at least one second base station, located in said network, that is asynchronous relative to the first base stations, said at least one second base station being in proximity of said first base stations;
said first and second base stations and said first mobile parts being connectible by wireless transmission of messages; and
first messages having first information are at least temporarily sent at least from one part of the first base stations, said first information including data that indicates that the at least one of the second base stations is in proximity to the first base stations.

* * * * *